United States Patent Office 3,194,113
Patented July 13, 1965

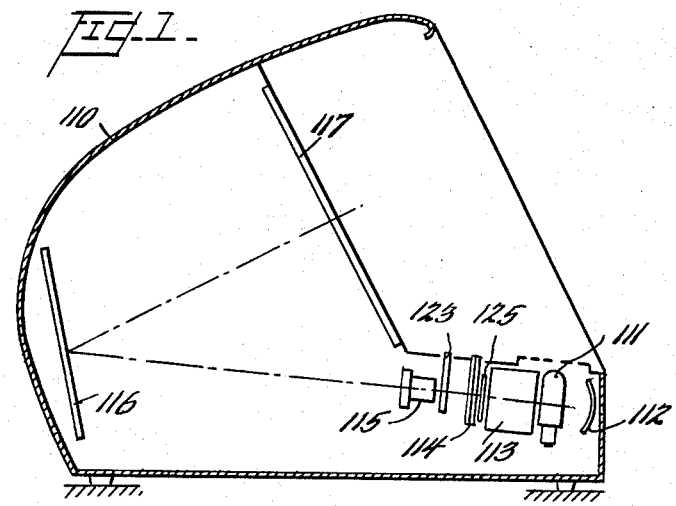
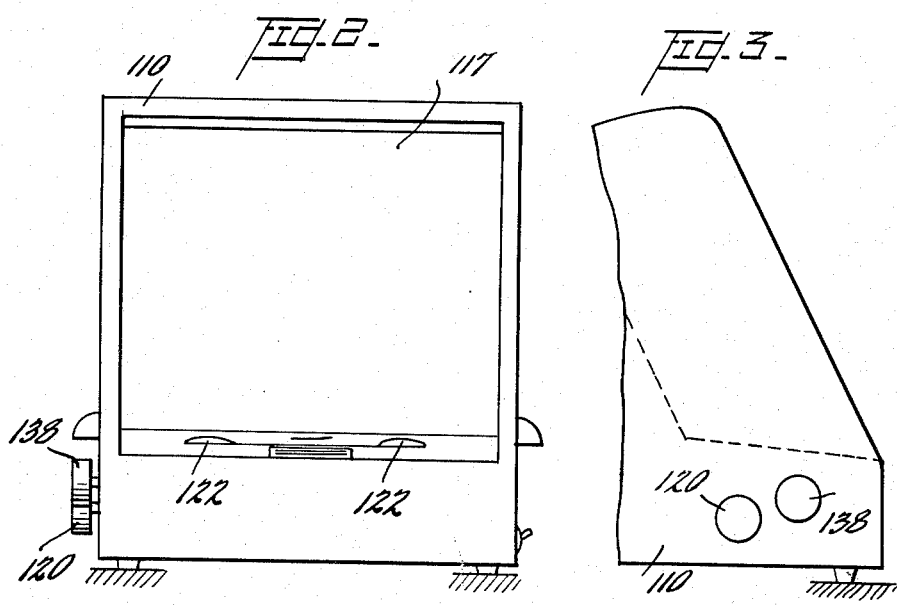
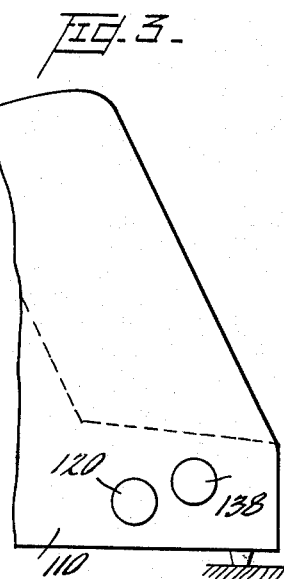
INVENTOR
Jean A. Knus,

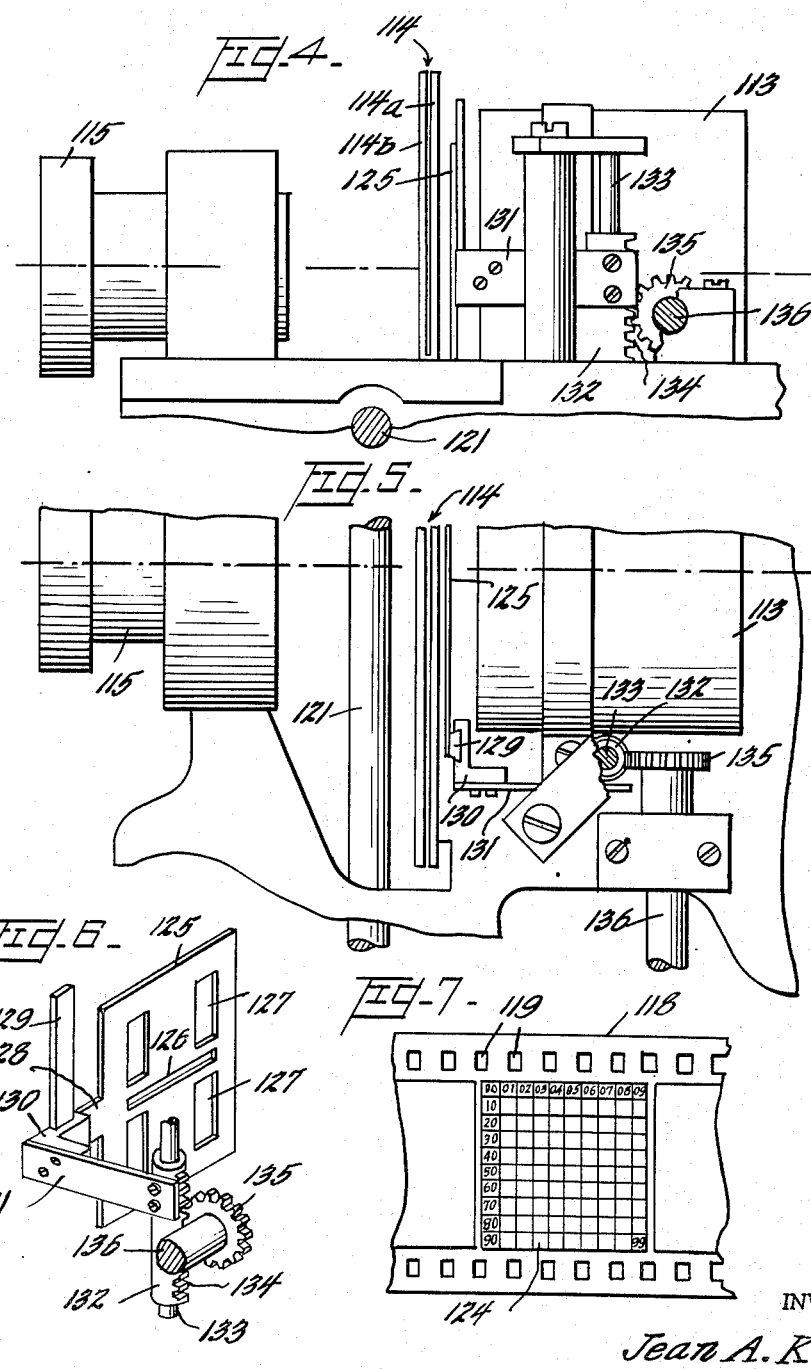

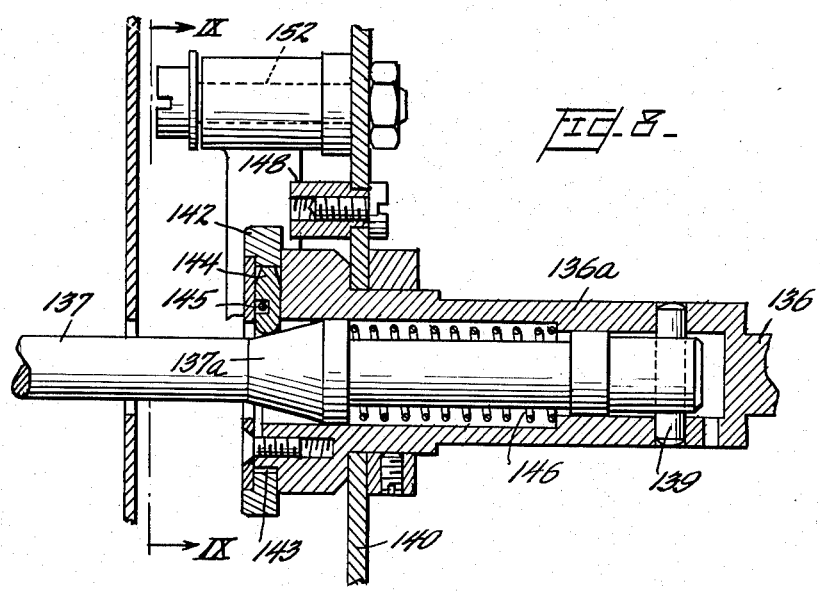
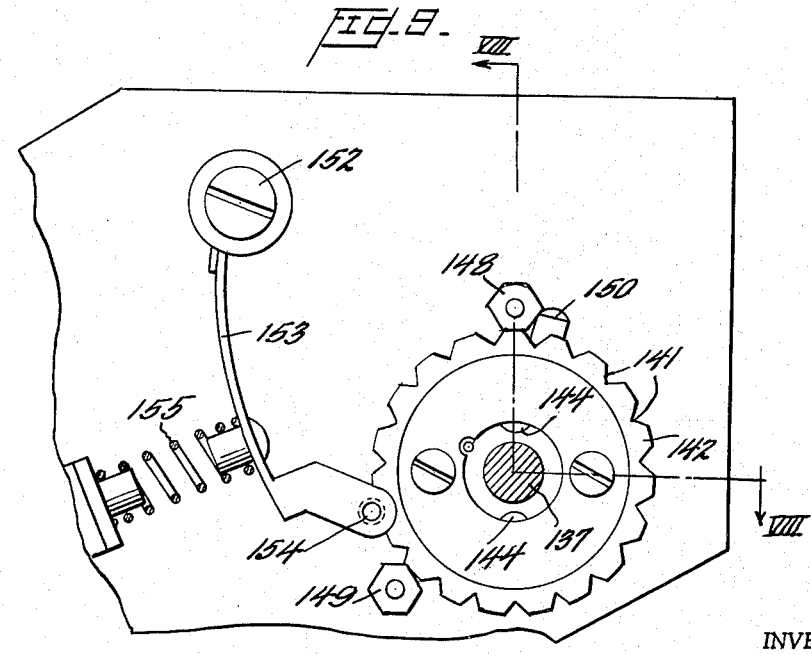

3,194,113
OPTICAL VIEWING APPARATUS WITH A
PROJECTION SCREEN
Jean A. Knus, Zurich, Switzerland, assignor to
Alos AG, Zurich, Switzerland
Filed Oct. 5, 1962, Ser. No. 228,715
Claims priority, application Germany, Oct. 5, 1961,
A 17,308
2 Claims. (Cl. 88—24)

The novelty refers to an optical viewing apparatus with a projection device for imaging a photograph of frames of a plurality of meters, arranged side-by-side in rows and one above another in columns, especially intended for calculating telephone charges. For this purpose it is customary to have indications of a whole series of meters, say one hundred, each time recorded simultaneously in a single photograph, to be read only later from the developed film and transferred to the keyboard of office machines. The photographs are taken on narrow films, say in the size 24 x 36 mm., for which reason, for the reading, magnifying of the photograph is indispensable. In this connection optical viewing apparatus with a projection device and a ground glass serving as projection screen are known.

Reading the meter indications in rows or columns from the projected image of each photograph becomes in time fatiguing, and there is a risk that the reader mistakes the row or the column, which may lead to errors in the billing. The aim of the novelty consists in eliminating practically entirely the described source of errors.

This aim is achieved in the viewing apparatus according to the instant novelty in that the projection device has in the vicinity of the film-guide plane an adjustable mask of opaque or colored, transparent material, by means of which any one row or column of frames can be made more distinct on the image of the photograph.

Further features of the invention will appear from the following description and claims, taken in conjunction with the accompanying drawing. This shows one preferred form of embodiment.

In said annexed drawing:

FIG. 1 is a diagrammatic vertical section of the apparatus, showing the projection device;

FIG. 2 shows a front view of the apparatus;

FIG. 3 shows a part of the apparatus as viewed from the left in FIG. 2;

FIG. 4 shows in side view, on a larger scale, a part of the projection device;

FIG. 5 is a top view of the parts shown in FIG. 4;

FIG. 6 shows diagrammatically the adjustable mask of the projection device with one of its holders, and a part of the means for shifting the mask;

FIG. 7 shows the photographic film with a photograph of the frame block of one hundred meters which are numbered in rows;

FIG. 8 shows a part of the driving means for shifting the mask, partly in view and partly in section on the line VIII—VIII of FIG. 9;

FIG. 9 shows the same parts in view and in section on the line IX—IX of FIG. 8.

The apparatus under review comprises a housing 110 having a projection lamp 111, an associated reflector 112, a condenser 113, a film guide 114, an objective 115, a deflecting mirror 116 and a ground glass 117 serving as projection screen. The latter is arranged sunk at the front of housing 110 so as to form a light-shaft in front of the ground glass for shielding it from extraneous light. The film guide 114 comprises two parallel, transparent plates 114a and 114b (FIG. 4). The film is a strip 118 with lateral perforations 119 (FIG. 7) which makes it possible to move the film strip by means of a toothed drum (not shown). The toothed drum is driven manually by means of a knob 120 which, as shown in FIGS. 2 and 3, is arranged outside the housing 110 and is in connection with the toothed drum through a shaft 121 (FIGS. 4 and 5) and a bevel gear (not shown). The ends of the film strip, winding up by themselves, are accommodated in shell-like depressions 122 of the housing (FIG. 2).

In order to make the image projected onto the ground glass 117 more agreeable for the eye, there may be inserted between the film guide 114 and the objective 115 a green filter 123 (FIG. 1), which is not shown in FIGS. 4 and 5.

The projection devices enables a photograph 124 (FIG. 7) of quite a number of meter frames existing on the film strip 118 to be produced as magnified on the ground glass 117. The photograph 124 contains for instance one hundred frames 00 . . . 99, which are arranged in ten rows of ten frames each. All the hundred frames are thus visible on the ground glass 117 simultaneously. The meters are to be read in the order of numbering the frames, i.e. row by row. To facilitate this, the viewing apparatus incorporates the following features:

Between the condenser 113 and the stationary plate 114a of the film guide 114 there is a movable mask 125 which consists of opaque or, in a given case, colored, transparent material. In its middle portion the mask 125 has a horizontal slit 126 (FIG. 6) through which a single row of frames (say 20 . . . 29) can be viewed. The rows above and below the viewed row are entirely covered by the mask 125. Further up and further down, additional perforations 127 are provided in the mask 125, and through them part of the other frames can be viewed. In the manner described hereinafter, the mask 125 is movable vertically from outside the apparatus, so that the slit 126 can be brought selectively in register with any one row of frames of the photograph 124.

A lateral extension 128 of the mask 125 is firmly connected to a rod 129 of trapezoidal cross-section. With its upper end this rod serves as handle for inserting and removing the mask 125, and is with its lower end exchangeably pushed into a suitably profiled recess of an angle piece 130. Through a bracket 131 said angle piece is rigidly connected to a sleeve 132 which is guided rectilinearly displaceable along a fixed rail 133. The parts 130, 131 and 132 together constitute a holder on which the mask 125 is exchangeably arranged.

The sleeve 132 is provided with teeth 134 and thus designed as a rack. The teeth 134 are retained in mesh with a gearwheel 135 which, by means of a two-piece shaft 136, 137 (FIGS. 4–6, 8 and 9) is connected to a knob 138 (FIGS. 2 and 3) at the outside of housing 110. The shaft piece 136, at its end away from the gearwheel 135, is provided with a hollow portion 136a designed as bush, in which the other shaft piece 137 carrying the knob 138 is guided axially displaceable. The two shaft pieces 136 and 137 are rotatably coupled to each other by means of a bolt 139. With its ends the bolt 139 is seated in radial bores of the hollow shaft portion 136a and penetrates with its middle part a longitudinal slot at the inner end of the shaft piece 137. The hollow portion of the shaft piece 136 is rotatably supported in a stand-plate 140, but secured against axial displacement.

The end of the hollow shaft portion 136a has rotatably supported thereon an annular disk 142 provided with notches 141 on its outer periphery. The inner periphery of said disk 142 has teeth 143 of a pitch much finer than that of the notches 141. Two radially running notches of the hollow shaft portion 136a have each a driving cog 144 arranged radially displaceable. These driving cogs 144 can with their outer end engage the teeth 143 and thus couple the disk 142 to the shaft 136, 137. Said driving cogs are biased by a circlip 145 which tends to disengage them from the teeth 143, and to press their inner ends onto a taper portion 137a of the shaft piece 137. Interposed between the hollow shaft portion 136a and the shaft piece 137 is a compression spring 146 which tends to push outwards the shaft piece 137 carrying the knob 138, i.e. to the left in FIG. 8, to thus bring the driving cogs 144 by means of the taper portion 137a into engagement with the teeth 143 of disk 142. The action of spring 146 is stronger than that of spring 145.

The plate 140 has fixed thereon two stops 148 and 149 which, in cooperation with a pin 150 radially projecting from the shaft portion 136a, define the rotating range of shaft 136, 137 and thus the shifting range of mask 125. Likewise mounted on plate 140 is a pin 152 having pivotally supported thereon an arm 153 which, at its free end, carries a small roller 154. A spring 155 tends to swing the arm 153 towards the annular disk 142, so that the roller 154 always rests on the outer periphery of the disk 142 and engages in its notches 141. The pitch of the notches 141 is chosen according to the pitch of the rows of the photograph 124 in such a way that, as the shaft 136, 137 turns from one notch to another, the slit 126 of mask 125 is shifted from one row to the next.

The mode of using the described viewing apparatus is as follows:

If a film strip 118 with several photographs is inserted between the film-guide plates 114a and 114b, by actuating the knob 120 it is set in such a way that the photograph 124 to be viewed is imaged entirely in the range of the ground glass 117. This setting is not hindered by the mask 125, inasmuch as, through the perforations 126, 127 thereof, the major part of the photograph to be viewed will be visible, and in the perforations 127 the extreme lefthand and righthand columns of the frames can be distinctly viewed. Subsequent to this, the mask 125 is moved upwards by means of the knob 138 until the slit renders visible the topmost row of frames 00 ... 09. If, in this position of the mask 125, the roller 154 of lever 153 does not engage one of the notches 141, this may be accomplished in a simple manner: at first the knob 138 is turned until the roller 154 snaps into a notch 141; then the knob is pressed inwards, whereby the shaft piece 137 in FIG. 8 is moved to the right, and the driving cogs 144 are disengaged from the teeth 143 of disk 142 by means of spring 145; then the knob 138 is turned until the mask 125 comes into the desired position; finally the knob 138 is released, whereby the spring 146 pushes the shaft piece 137 in FIG. 8 back to the left, thus causing the driving cogs 144 to re-engage the teeth 143 by means of the taper portion 137a. When the first row of frames has been read, the knob 138 is turned until the next notch 141 comes within the range of roller 154. Thereupon the slit 126 of mask 125 sets free the second line with frames 10 ... 19, whilst the first and third rows are covered by the mask. In a similar way the slit 126 can be brought to register with each following line of frames.

Obviously, by means of the mask 125, the row of frames to be viewed and read at the time, can be made quite distinct from the mass of other frames of the photograph 124, and thus it is possible to read much easier and practically free from error.

If, on the other hand, it is required to view the whole photograph 124 on the ground glass, the mask may be readily removed from the apparatus by taking hold of the rod 129 and withdrawing it upwards with the mask.

In a modified form (not shown) the mask cannot be moved up and down, but to the left and to the right, in which case the slit 126 does not run horizontally, but vertically. By means of the mask it is then possible to make distinct any one column of frames of the photograph from the mass of other frames and to read it without error.

What I claim is:

1. Optical viewing apparatus with a projection screen for imaging a photographic recording on a film, said film having frames of a plurality of meters arranged side-by-side in rows and one above another, particularly for calculating telephone charges, said viewing apparatus comprising a shiftable mask of material, by means of which any one row or column of frames can be made quite distinct on the screen, an adjustable holder to be actuated from outside the apparatus so that the mask is exchangeably mounted thereon, said holder being guided for rectilinear movement and provided with a rack in mesh with a gearwheel rotatable by a knob outside the apparatus, a shaft connecting the knob and gearwheel, a notched disk on the shaft with which a spring-loaded catch cooperates, the pitch of the notches corresponding to the pitch of the rows or columns, said disk having teeth on its inner periphery of a pitch several times finer than those of the notches and is releasably coupled to the shaft through at least one driving cog engaging said teeth, and said shaft comprising an axially fixed partly hollow piece and an endpiece axially movable therein which is connected for rotation to the first-named piece and carries a knob and has a tapered portion which, upon axial movement, causes engagement of said driving cog with or disengagement from the teeth of the notched disk.

2. Viewing apparatus according to claim 1, in which the driving cog being spring-biassed to disengage the same from said teeth, and in which a stronger spring is provided interposed between the two shaft pieces capable of causing an opposing action by suitably displacing the endpiece.

References Cited by the Examiner

UNITED STATES PATENTS

| 1,738,762 | 12/29 | De Vault | 88—28 |
| 2,255,319 | 9/41 | Kanter | 88—24 |
| 2,299,973 | 10/42 | Getten | 88—28 |
| 2,357,593 | 9/44 | Leavell. | |

NORTON ANSHER, *Primary Examiner.*

WILLIAM MISIEK, *Examiner.*